L. DE FOREST.
SECRECY SYSTEM FOR WIRELESS COMMUNICATION.
APPLICATION FILED OCT. 15, 1908.

1,123,119.

Patented Dec. 29, 1914.
3 SHEETS—SHEET 1.

Witnesses,
Hubert A. Gill.
Albert Edward O'Dell.

Inventor
Lee de Forest
per:- Samuel E. Darby
Attorney.

L. DE FOREST.
SECRECY SYSTEM FOR WIRELESS COMMUNICATION.
APPLICATION FILED OCT. 15, 1908.

1,123,119.

Patented Dec. 29, 1914.
3 SHEETS—SHEET 2.

Witnesses
Hubert A. Gill.
Albert Edward O'Dell

Inventor
Lee de Forest
per: Samuel E. Darby
Attorney.

L. DE FOREST.
SECRECY SYSTEM FOR WIRELESS COMMUNICATION.
APPLICATION FILED OCT. 15, 1908.

1,123,119.

Patented Dec. 29, 1914.

Witnesses.
Hubert A. Gill
Albert Edward Odell

Inventor
Lee de Forest
By
Samuel E. Darby
Attorney.

UNITED STATES PATENT OFFICE.

LEE DE FOREST, OF NEW YORK, N. Y., ASSIGNOR TO DE FOREST RADIO TELEPHONE & TELEGRAPH COMPANY, A CORPORATION OF DELAWARE.

SECRECY SYSTEM FOR WIRELESS COMMUNICATION.

1,123,119.   Specification of Letters Patent.   Patented Dec. 29, 1914.

Application filed October 15, 1908. Serial No. 457,859.

*To all whom it may concern:*

Be it known that I, LEE DE FOREST, electrical engineer, a citizen of the United States, residing at 225 Fourth avenue, in the city, county, and State of New York, United States of America, have invented a Secrecy System for Wireless Communication, of which the following is a specification.

This invention relates to secrecy system for wireless communication.

The object of the invention is to provide means for securing secrecy of communication whether by wireless telegraphy or wireless telephony.

The invention consists substantially in the combinations and arrangements as will be more fully hereinafter set forth, as shown in the accompanying drawing and finally pointed out in the appended claims.

Referring to the accompanying drawings and to the various views and reference signs appearing thereon.

In carrying out my invention I utilize electric currents of low frequencies, through the action of which, conjointly accomplished, or otherwise, the communication is effected. I also utilize means for generating and radiating electrical oscillations in the production of the currents of low frequencies, and in connection with such generation and radiation, I employ means for controlling and varying the characteristics or relation of the low frequency currents, such control or variation being effected arbitrarily and in accordance with a pre-arranged code or schedule or otherwise, as will be more fully hereinafter set forth, whereby it is impossible for any one overhearing the transmitted signals to understand the transmitted message without knowledge of the pre-arranged code or schedule, whether employing the identical apparatus or not.

Figures 1, 2, 20:
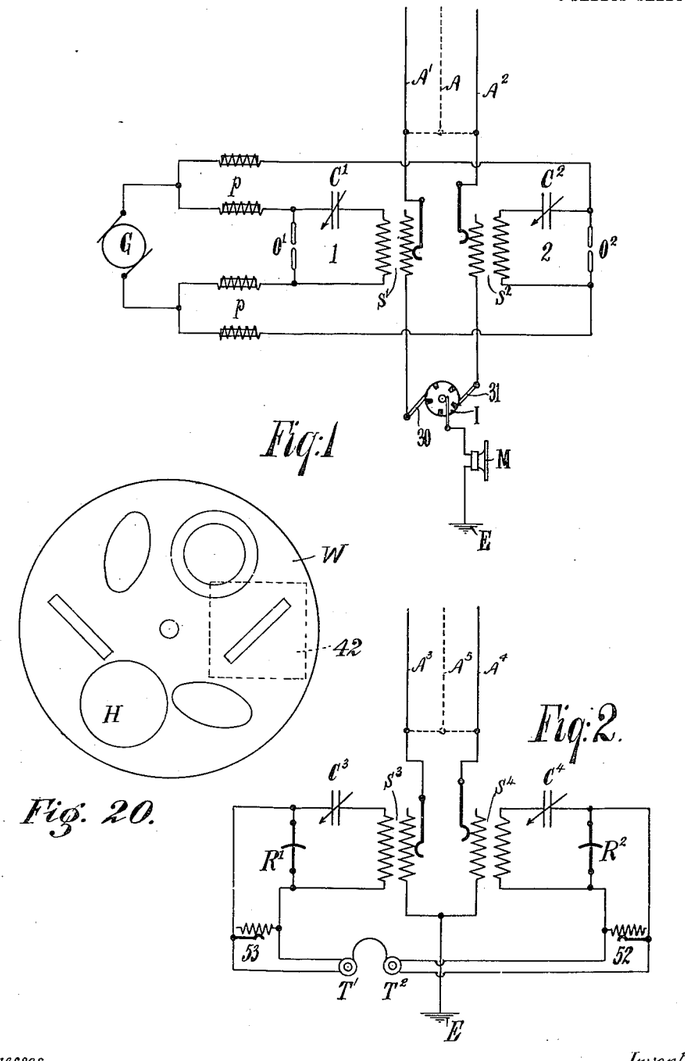
Figure 1 is a diagrammatic view of a wireless telephone transmitter showing an application of the principles of the secrecy system of my invention.
Fig. 2 is a similar view showing the coöperating arrangement at the receiving station.
Fig. 20 is a detail view of a shutter and screen arrangement adapted for use in connection with the principles of my invention.

In Figs. 1 and 2, I have indicated an arrangement for carrying out my invention in the application thereof to a wireless telephone system, wherein $A^1$, and $A^2$, respectively indicated antenna systems at the transmitting station and $A^3$, $A^4$ corresponding antenna systems at the receiving station. At the transmitting station each antenna system is associated, inductively or otherwise, with an oscillating circuit in such way and relation as to cause electric radiations of relatively different wave lengths to be emitted from the respective antenna systems. Thus, in the form and arrangement I have selected for illustrating my invention, the antenna system $A^1$, is associated inductively through the coils $S^1$, one or both of which may be adjustable, with an oscillating circuit containing an oscillator $O^1$, and a variable condenser $C^1$. Similarly, the antenna system $A^2$, is associated inductively, in the case shown, through coils $S^2$, one or both of which may be adjustable, with an oscillating circuit containing an oscillator $O^2$, and a variable condenser $C^2$. The oscillators $O^1$, $O^2$ may be of any well known type of such devices. In practice, however, I prefer to employ electric arcs for this purpose. These oscillators may be fed from any suitable or convenient source, such, for instance, as generator G, the current source circuits containing choke coils $p$, in the usual manner. The couplings $S^1$, $S^2$, are so relatively arranged with respect to the associated members, thereof as to produce radiations of energy waves in the antenna system $A^1$, having a different wave length from the waves radiated from the antenna system $A^2$. Thus, the wave length of the waves radiated from antenna system $A^1$, may be, say, one thousand meters, while the waves radiated from antenna system $A^2$ may have a wave length of, say, one thousand and fifty meters. It is to be understood that the radiated waves may have any other relative lengths.

The antenna systems $A^1$, $A^2$, may have separate aerial conductors as indicated in full lines in Fig. 1, or they may have the same aerial conductor, as indicated in dotted lines at A.

The aerial systems $A^1$, $A^2$, are connected to earth at E, through an interrupter, indicated at I, which, if desired, and as shown, may be in the form of a commutator having alternating conducting and insulating segments, the arrangement thereof being such that when the contact brush 30 of one antenna system is insulated from earth through an insulating segment of the interrupter, the contact brush 31 of the other antenna system is grounded through a conducting segment of the interrupter, and it is desirable that the instant one brush passes from a conducting segment the other brush passes onto such a segment. Within these qualifications the conducting segments and contact brushes may have any desired relative arrangement and relation.

The interrupter I may be operated in any convenient manner. Where a commutator is employed it should be rotated, and at such speed or rate as to vary the amplitude of the continuously emitted waves in a periodic or harmonic manner.

In the antenna systems, and preferably in the ground circuit thereof, I arrange a modifying device, such for instance, as a microphone M in the case of wireless telephony, of such character as to enable variations and modifications to be impressed on the oscillations in the antenna systems by and in accordance with sonorous vibrations accompanying voice or other sounds.

The antenna systems $A^3$, $A^4$ at the receiving station are grounded at E and are respectively tuned to the transmitting antenna systems $A'$, $A^2$. These receiving antenna systems may have separate aerial conductors as indicated in full lines, or they may employ the same aerial as indicated in dotted lines at $A^5$. Each of said systems is associated inductively or otherwise with a receiving circuit. The system $A^3$ is shown coupled in inductive relation through coils $S^3$ one or both of which may be adjustable with a receiving circuit containing a variable condenser $C^3$ and a receiver, such as a telephone $T'$, this circuit being bridged in the usual way by a detector $R'$. Similarly the antenna system $A^4$ is coupled inductively through coils $S^4$, one or both of which may be adjustable, with a receiving circuit containing a variable condenser $C^4$ and a receiver $T^2$. this circuit being bridged by a detector $R^2$.

From the foregoing description it will be seen that at the transmitting station energy waves having wave lengths varying from each other are generated and radiated in alternation. These waves are modified by and in accordance with the sonorous vibrations accompanying articulate speech or other sound and the radiated waves so modified, intercepting the receiving aerial or aerials at the distant receiving station develop oscillations in the antenna systems at such station which oscillations are so developed alternately in the respective receiving antenna systems according as the waves producing them are radiated from one or the other of the transmitting antenna systems. The oscillations developed in the antenna system $A^3$ are detected in its associated receiving circuit and the sounds employed at the transmitting station to modify that portion of the radiated waves which are radiated from the antenna system $A'$ are reproduced at the receiving station in the receiver $T'$ or in one of the coils of the common telephone. Similarly the oscillations developed in antenna system $A^4$ due to the modified waves radiated from transmitting antenna system $A^2$ are detected in the receiving circuit which is associated with the system $A^4$ and the sounds employed to effect the modifications of the waves radiated from the system $A^2$ are reproduced in the receiver $T^2$ or the common telephone as the case may be. A receiving operator holding the one receiver $T'$ to one ear and the other receiver $T^2$ to the other ear will hear the transmitted message partly with one ear and partly with the other, the sensation being substantially the same as if received with only one ear. Should another receiving station happen to be tuned to the wave length of one or the other of the transmitting systems and its corresponding receiving systems only an unintelligible portion of the transmitted message could be read consisting of, say, parts of the syllables of the words or of parts of words forming a jumble of sounds which could not be understood.

In order to intelligently intercept the complete message at another receiving station it would be necessary to vary the tuning at such station in consonance with the variations in wave lengths of the waves respectively radiated from the radiating antenna systems $A'$, $A^2$ and this would be practically impossible, especially if the construction of the interrupter I were such as to cause the variations at irregular intervals. In order to still further insure against any such possibility and to introduce further arbitrary variations, a prearranged code or schedule known only to the operators at the particular transmitting and receiving stations desiring to communicate without detection, may be employed according to which the wave lengths of either or both the transmitting systems and their associated receiving systems may be changed arbitrarily, but to the same extent so as to retain their respective tuning. Thus it may be prearranged that when the operator at the transmitting station should say at some point of his message "A thirty" the receiving operator will understand that the transmitting operator is going to adjust his variable condenser C' and inductance S' to a certain predetermined extent, whereupon the operator at the receiving station will correspondingly and to the same extent make the same adjustments of his condenser $C^3$ and inductance $S^3$. In like manner if the transmitting operator should say "B forty" the receiving operator will know that the condenser $C^2$ and inductance $S^2$ are going to be adjusted to a certain predetermined point and that he must make corresponding adjustments of his condenser $C^4$ and coupling $S^4$. Thus any desired pre-arranged code system may be employed enabling any particular variations and adjustments to be made coincidently at the transmitting and receiving stations, and at arbitrary and irregular intervals without interfering with the transmission of the message so rendering it impossible for any other receiving station even when employing the same apparatus, to intercept and understand the transmitted message, without knowledge of the pre-arranged code or schedule according to which the variations and adjustments are introduced. Nor can any two or more stations working together in the effort to intercept the transmitted messages be able even by comparing their results to make out any intelligible message.

Figures 3, 5:
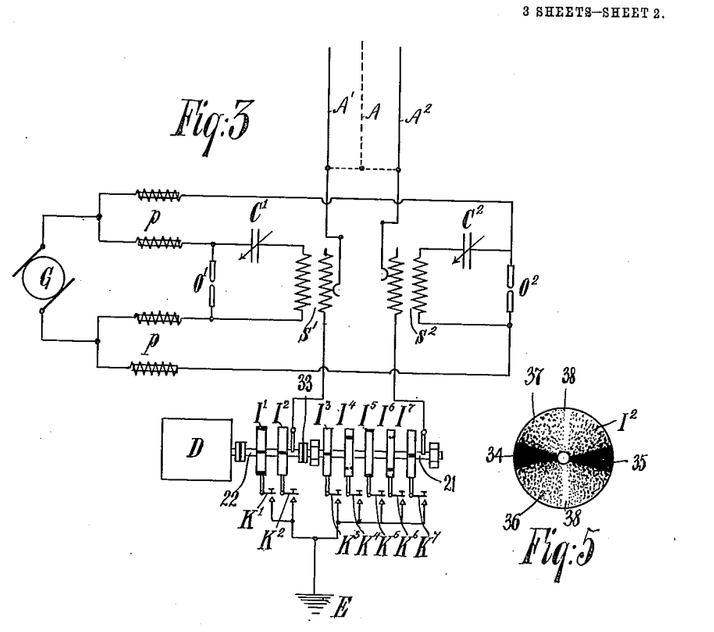
Fig. 3 is a similar view of a wireless telegraph transmitting station showing the application of the principles of the secrecy system embodying my invention.
Fig. 5 is a detail view showing a form of commutator adapted for employment in connection with my invention.
Figure 4:
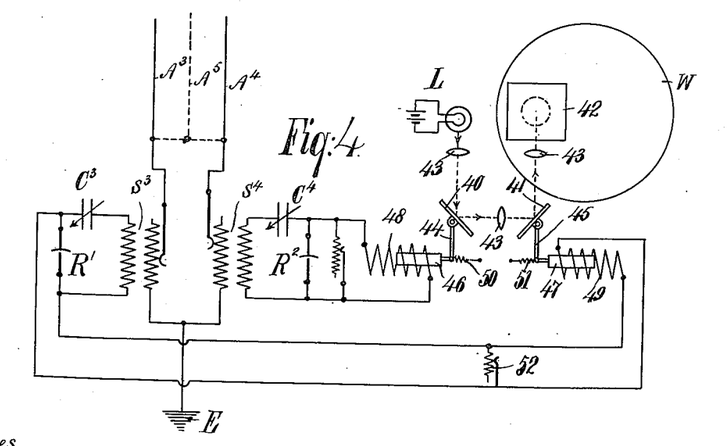
Fig. 4 is a similar view showing the coöperating arrangement at the receiving station.

In Figs. 3 and 4 I have shown an arrangement of practical application of my invention in secrecy systems to wireless telegraphy, Fig. 3 showing the arrangement at the transmitting station and Fig. 4 showing the arrangement at the receiving station. With the exceptions hereinafter noted the antenna systems and their associated oscillating current source and receiving circuits remain the same as in the corresponding systems and circuits above described with reference to Figs. 1 and 2. In the case of the telegraph transmitting arrangement shown in Fig. 3, however, the earth connection of antenna system $A^1$, is effected through either one or another of two or more interrupters $I^1$, $I^2$, which, in this instance, are shown in the form of commutators having alternating conducting and insulating or resistance segments, the ground connections of said interrupters being completed by keys $K^1$, $K^2$. Similarly, the antenna system $A^2$, is connected to earth through either one or another of the interrupters $I^3$, $I^4$, $I^5$, $I^6$ and $I^7$, and associated keys $K^3$, $K^4$, $K^5$, $K^6$ and $K^7$. The periodic variations in the amplitude of the oscillations in the antenna systems $A^1$, $A^2$, should be of a relatively low frequency say of the order of two hundred or three hundred or even less per second. A convenient arrangement for accomplishing this is shown wherein the interrupter commutators are mounted on a shaft driven from a motor D, at any desired rate of speed, say, for instance, at sixty revolutions per second, and the commutators when provided with two insulating and two conducting segments, will give a rate of one hundred and twenty amplitude variations per second. The shaft carrying the commutators is divided into two portions, the one 21 carrying the commutators $I^3$, $I^4$, $I^5$, $I^6$ and $I^7$, which are associated with the system $A^2$, while the portion 22, which should be insulated from the portion 21, as indicated at 33, carries the commutators $I^1$, $I^2$, associated with the system $A^1$. In Fig. 5, I have shown a form of commutator which is well adapted for use in connection with my invention, and wherein the two conducting segments 34, 35, are placed diametrically opposite each other, and are separated on each side by insulating or resistance segments 36, 37, of such construction and arrangement that the resistance thereof is at the maximum at the points 38, midway between the conducting segments 34, 35, and such resistance decreases gradually from such mid point to the conducting segments. Carbon or graphite affords a suitable material for this purpose.

One of the commutators $I^1$, $I^2$, say, for instance, $I^2$ may be provided with two insulating and two conducting segments so as to secure one hundred and twenty amplitude variations per second when the shaft 22 is rotated at a speed of sixty revolutions per second while the commutator $I^1$ may be provided with four conducting and four insulating segments to secure two hundred and forty variations per second when said shaft is driven at the rate of sixty revolutions per second. Of course these relations are merely illustrative and any other speed of rotation, or rate of variation may be employed.

In practice I prefer that the commutators $I^3$, $I^4$, $I^5$, $I^6$ and $I^7$ shall effect the same rate of variation, as, for, instance, by providing commutators having the same number of conducting and insulating segments. These variations, however, are arranged in accordance with my invention, to effect the variations at certain intervals apart, or in certain desired positions of relative angular displacement so as to effect the variations in predetermined relative phase displacements. Thus the commutator $I^3$ may effect the amplitude variation of the oscillations in antenna system $A^2$, in exact phase relation with respect to the amplitude variations in system $A^1$ or at say 0° displacement with respect thereto, the commutator $I^4$, at 45° displacement, the commutator $I^5$ at 90°, the commutator $I^6$, at 135°, and the commutator I⁷ at 180°. Of course these suggestions are merely illustrative and any other desired relation may be embodied with equal facility or without departure from the spirit and scope of my invention.

Figure 6:
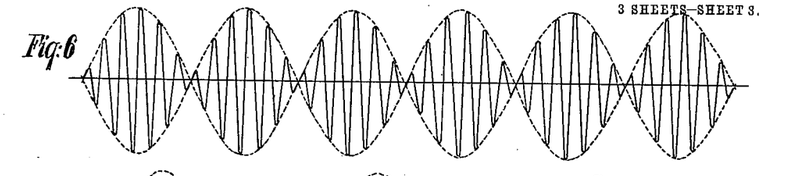
Figs. 6, 7, 8, 9 and 10, are wave diagrams illustrating the action of the secrecy system.
Figure 7:
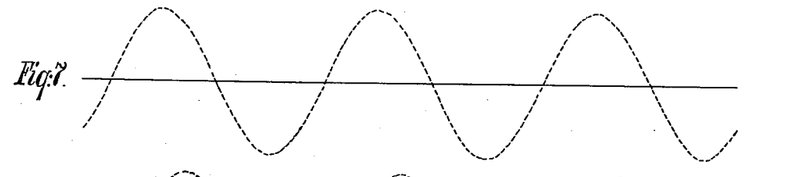
Figure 8:
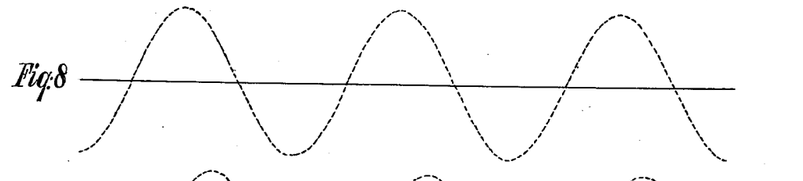
Figure 9:
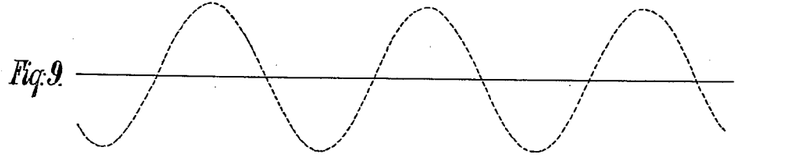
Figure 10:
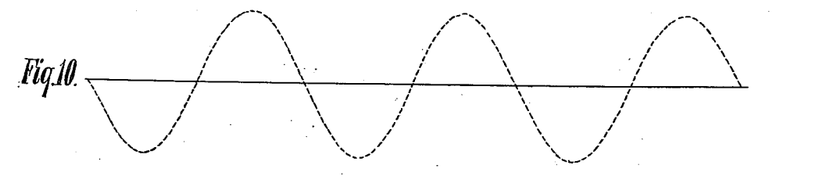

From the foregoing description it will be seen that when the key K¹ is depressed the oscillations in the antenna system A¹ are modified as to their amplitude a given number of times per second as determined by the number of conducting and insulating or resistance segments of the commutator I¹, say at the rate of 240 per second. By depressing the key K², the amplitude variations in the antenna system A¹, occur at some other rate, say 120 per second. In the case of keys K³, K⁴, K⁵, K⁶ and K⁷, however, the rate of amplitude variation of the oscillations in the antenna system A², remains the same whichever one of said keys is depressed the difference being that the radiated pulsations are in displaced phase relation with respect to those radiated from system A¹ according to which particular key is depressed. While I have referred to certain degrees of relative displacements of the phase relation it is to be understood that these are merely illustrative, and that any desired relation may be employed. In Figs. 6, 7, 8, 9 and 10 I have indicated graphically the displacements of the wave phases effected by the different relatively displaced commutators. Thus in Fig. 6 is shown the radiated wave produced in system A² by the variations at 0° displacement relative to the pulsations in the antenna system A¹. In Fig. 7 is indicated the wave at 45° lag. In Figs. 8, 9 and 10 are indicated respectively the radiated waves with variations at 90° lag, 135° lag and 180° lag. It is obvious that the curves of the waves for any other desired relative lag may be readily plotted.

At the receiving station I utilize the low frequency currents produced by the energy waves radiated as above described, to effect the desired secrecy of communication. This utilization may be accomplished in a wide variety of ways. I have shown one simple and very effective arrangement for accomplishing the desired results wherein I arrange means to be influenced by the currents in the receiving circuits of the antenna systems A³ and A⁴, and acting conjointly or otherwise to reproduce or otherwise make manifest the received signal, it being remembered that the receiving antenna system A³, is always in tune with and only responsive to the transmitting antenna system A¹, while the system A⁴, at the receiving station is always in tune with and only responsive to the transmitting system A². As illustrative of the principle involved, I employ two mirrors 40, 41 pivotally or otherwise mounted for movement, and while for convenience of illustration these mirrors are shown as rocking or moving in the same plane, in practice I so arrange them relatively to each other as to rock or swing in planes at right angles to each other. A beam of light from any suitable source as for instance a lamp, as indicated at L, is caused to fall upon the mirror 40, at such angle of incidence as to be reflected therefrom to the mirror 41, and thence to a suitable screen 42. If desired lenses 43, may be employed to properly focus the beam of light thus projected upon the mirrors and screen. Rocking arms 44, 45, are respectively connected to the mirrors 40, 41, to move them, said arms being also respectively connected to or associated with the armatures 46, 47, of solenoids 48, 49, respectively arranged in the receiving circuits of antenna systems A³, A⁴, to be energized by currents in said circuits. The action of the solenoids 48, 49, may be yieldingly opposed in any desired manner, as for instance, by the retracting springs 50, 51. If desired, and preferably, adjustable resistances 52, 53, are bridged across the receiving circuits associated with the antenna systems A³, A⁴, in order to afford means for controlling, regulating and varying the strength of the currents flowing through the coils of the solenoids 48, 49.

Figure 11:
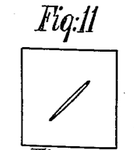
Figs. 11, 12, 13, 14, 15, 16, 17, 18 and 19 are diagrams illustrating principles of the secrecy system of my invention.
Figure 12:
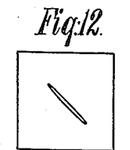
Figure 13:
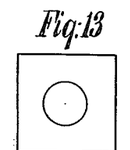
Figure 14:
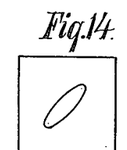
Figure 15:
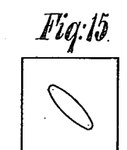
Figure 16:
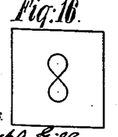
Figure 17:
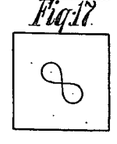
Figure 18:
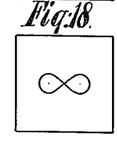
Figure 19:
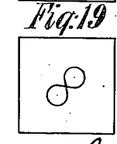

Remembering, now, that one of the mirrors, as 40, is influenced in its movements by solenoid 48, which is acted on only by currents produced in the receiving antenna system A³, by the pulsations radiated from antenna system A¹, and that the movements of the mirror 41 are influenced only by the currents in solenoid 49 induced by the pulsations radiated from transmitting antenna system A², and that such pulsations are effected in predetermined displaced phase relation with respect to the pulsations radiated from antenna system A¹, I will now describe the effect of the combined or conjoint action of the movements of the mirrors upon the beam of light. Suppose the local currents produced in the circuits of the solenoids 48, 49, are in 0° phase displacement with respect to each other, then the beam of light projected on the screen 42, will move in directions corresponding to the components of two equal forces acting at right angles to each other at the same rate and in the same direction. The result is that the beam of light will describe a straight path inclined to the right at an angle of say 45°, to the vertical, as indicated in Fig. 11. In other words, by simultaneously depressing keys K¹ and K³, the conjoint action of the resulting local currents produced at the receiving station in the solenoid circuits, on the mirrors is such as to cause said mirrors to so relatively move as to cause the beam of light to describe the inclined path on the screen as indicated in Fig. 11. If only the key K¹ were depressed then the beam of light would move in a direction determined by the movement of only the mirror 41, that is, in a horizontal straight line, and if only key K³ is depressed, then the beam of light would move in a straight line at right angles to the line of movement thereof produced when the key K¹ is depressed. So, too, if key K¹ of system A¹ is depressed coincidently with that key of system A² which produces in the receiving circuit of system A⁴ a current in 180° displacement of phase relation then the projected light beam will describe a straight line inclined to the left from the vertical, as indicated in Fig. 12. If, while key K¹ is depressed, the key of system A², which causes a displacement of phase relation of the local currents at the receiving station of, say 90°, then the conjoint action of the mirrors on the beam of light is to cause the latter to describe a circle, as indicated in Fig. 13. In similar manner, local receiving currents which are 45° out of phase relation will cause the beam of light to travel in an elliptical path which is inclined to the right from the vertical, as indicated in Fig. 14, and if said currents are in 135° of phase displacement then the beam of light will describe an elliptical path inclined to the left from the vertical as indicated in Fig. 15. If the key K² is employed instead of key K¹ thereby increasing the number of wave amplitude variations in the system A¹, then the conjoint effect of the local currents at the receiving station is to cause the mirrors to move in such relation as to cause the beam of light to describe figures-of-eight, vertical, horizontal, inclined to the right, or inclined to the left according to the relative displacement of phase relation of the local currents depending on the particular key of the transmitting system A², which is depressed.

Of course it will be understood that messages are not to be read from the screen directly since the beam of light is traveling thereover in indiscriminate direction without reference to the message being transmitted, and purposely so through the indiscriminate manipulation of other keys in addition to the ones employed in transmitting the message in order to prevent any interception of the message by any other receiving station. In order to enable the desired message to be intelligently received I employ a shutter W, (Fig. 20) associated with the screen 42, in proper relation according to whether an opaque or a transparent screen is employed. Where a transparent screen is used the shutter W is in the form of an opaque disk pivotally mounted at its center in front of the screen, as indicated in Fig. 20, the beam of light being projected on the rear side of the screen. This shutter is adapted to be rotatively displaced axially according to a suitably arranged scale corresponding to the displaced phase relation of the local currents in the receiving circuits, and in the shutter are placed transparent slits or openings corresponding to the inclination or other characteristics of the paths of the beam of light according to the phase relation of the local currents in the receiving circuits. Thus, the shutter is provided with a straight inclined slit adapted to be brought into juxtaposition with reference to the screen when the shutter occupies 0 position. This is the position for reading the transmitted signals when the key corresponding to 0° displacement of phase relation of local currents in the receiving circuits is depressed. Corresponding inclined, circular or elliptical slits are formed in the shutter and which are respectively brought into juxtaposition with reference to the screen according to the degree of phase displacement of the local currents and the scale graduations denoting the various positions of displacement of the shutter with reference to the screen are thus made to correspond to the displacements of phase relation in the local currents in the receiving circuits. The shutter is also provided with a circular opening indicated at H, to be employed when the key K² is operated and figures-of-eight are described by the beam of light. In this way by suitably and properly shifting the shutter into the desired position with reference to the screen so as to bring one or another of the shutter slits opposite the screen, only the corresponding direction or characteristic of light beam movement will be disclosed notwithstanding the fact that the light beam may be moving in other and indiscriminate directions due to the interspersed manipulation of other keys beside the ones employed to transmit the message. It will also be seen that the shutter may be shifted at will to bring any desired slit into juxtaposition with reference to the screen according to any desired prearranged code or schedule so that part of a message may be received with one direction or characteristic of light beam movement and other portions of the message may be received with other directions or characteristics of light beam movements, and the changes from one to the other effected at any time solely at the will of the sending operator, and without reference to the beginning, ending or other relation of a word or part of a passage. Thus, suppose it is prearranged that the message to be secretly transmitted should commence with the beam of light describing a straight line inclined to the right from the vertical; in such case the sending operator will depress key K¹, of the transmitting antenna system A¹, and then manipulate the particular key of system A² as, for instance key K³, which varies the wave amplitudes in said system in the desired phase relation with the variations of amplitude in the system A¹. This manipulation of key K³ will be carried on in the required manner to produce Morse code letters, or other readable signals. During the coincident operation of keys K¹ and K³, the receiving operator will read the message by noting the relative durations of the inclined line of the light beam movements through the proper slit in the shutter which has been previously moved into the required position opposite the screen, a long duration of such inclined line of beam movement, for instance, representing a dash and a short duration representing a dot of the Morse or other code. Meanwhile, and in order to prevent and insure against the possibility of detection, the sending operator may also manipulate other keys and in indiscriminate order thereby introducing other variations of light beam movements having no reference to the transmitted message, and producing unintelligible signals, but the receiving operator reads the message only from the straight line of light inclined to the right, which he observes through the slit in the shutter. Now suppose the sending operator should in the midst of the message he is transmitting, and at any desired arbitrary instant, send a prearranged code or schedule word, as for instance, "A one," "A two," "A three," and so on, then the receiving operator will understand that the message being transmitted is to be continued according to some other direction or characteristic of movement of the light beam, as, for instance, the straight line inclined to the left, the circle, the ellipse and so on, according to the prearanged code signal received. He thereupon shifts the shutter into proper and corresponding position and continues to read the transmitted message without reference to any other direction of movement of the light beam which, for confusion purposes, the transmitting operator may introduce; and if the transmitting operator should desire to introduce still other variations as by employing the key K² instead of key K¹, in combination with one or another of the keys of the transmitting system A², he will preliminarily send the prearranged code or schedule signal, as, for instance "B one," "B two," "B three," and so on, thereby indicating to the receiving operator the desired combination which is to be employed in message transmission and enabling such operator to properly shift his shutter into the corresponding position. Thus, by varying the wave amplitudes of radiated pulsations in the desired and prearranged order of phase relation, the message is transmitted without the possibility of detection by other receiving operators than the particular one to whom the secret message is to be transmitted, and the operation is carried on in an exceedingly simple manner.

My invention in its broad scope and as defined in the claims is not to be limited or restricted to the particular arrangement and details herein shown and described, as variations therefrom throughout a wide range may be made without departure from the spirit or scope of my invention.

What I claim as new and useful and of my own invention and desire to secure by Letters Patent is:—

1. In a secrecy system for wireless communication, a plurality of alternately radiating systems, means to radiate electromagnetic waves from each, the waves radiated from one having a length differing from that of waves radiated from the other, means for relatively varying at a low frequency rate the characteristics of the waves radiated from both radiating systems in accordance with a message to be transmitted, and means controlled by the relatively varied radiations for making manifest the transmitted message.

2. In a secrecy system for wireless communication, a plurality of radiating systems respectively operating to radiate electro-magnetic radiations of different wave lengths, means for converting the received oscillations into low frequency currents at the receiving station, and means for utilizing said currents to make manifest the receiving message.

3. In a secrecy system for wireless communication, means for continuously radiating electrical oscillations of respectively different wave lengths, means at the receiving station for converting the received oscillations so generated and radiated into regular pulsating currents of low frequency and means for utilizing said currents to make manifest the received message.

4. In a secrecy system for wireless communication, means for continuously radiating electrical oscillations of respectively different wave lengths and modifying the same according to the message to be transmitted, means at the receiving station for converting the received oscillations so generated, modified and radiated into simple harmonic pulsating currents of low frequency at the receiving station, and means for utilizing said currents to make manifest the received message.

5. In a secrecy system for wireless communication, means for generating and continuously radiating electrical oscillations of respectively different wave lengths, and relatively modifying the same in accordance with the message to be transmitted, means at the receiving station for converting the received oscillations so generated varied and radiated into electric currents of low frequency, and means for utilizing said currents to make manifest the received message.

6. In a secrecy system for wireless communication, means for generating and continuously radiating electrical oscillations of respectively different wave lengths and relatively modifying the same in accordance with the message to be transmitted, means at the receiving station for converting the received oscillations so generated, varied and radiated into regular pulsating electric currents of low frequency, and means for utilizing said currents to make manifest the received message.

7. In a secrecy system for wireless communication, means for generating and continuously radiating electrical oscillations of respectively different wave lengths, means for varying the phase relation of the radiated waves and means at the receiving station for converting the received oscillations so generated varied and radiated, into regular pulsating electric currents of low frequency.

8. In a secrecy system for wireless communication, means for generating and continuously radiating electrical oscillations of respectively different wave lengths, means for relatively varying the characteristics of the radiated waves, and means at the receiving station for converting the received oscillations so generated varied and radiated, into harmonic pulsating electric currents of low frequency.

9. In a secrecy system for wireless communication, means for generating and continuously radiating electrical oscillations of respectively different wave lengths, means for relatively varying the characteristics of the radiated oscillations in a predetermined order of variation, and means at the receiving station for converting the received oscillations into electric pulsations of low frequency.

10. In a secrecy system for wireless communication, means for generating and continuously radiating electrical oscillations of respectively different wave lengths, means for alternately varying the characteristics of the respectively radiated waves, and means at the receiving station for converting the received oscillations so generated, varied and radiated, into electric currents of low frequency.

11. In a secrecy system for wireless communication, means for generating and continuously radiating electrical oscillations of respectively different wave lengths, means at the receiving station for converting the oscillations so generated and radiated into electric currents of low frequency, and means for making manifest the converted currents without relation to the signal elements transmitted.

12. In a secrecy system for wireless communication, means for generating and continuously radiating electrical oscillations of respectively different wave lengths, means for alternately varying the characteristics of the radiated waves without regard to the signal elements to be transmitted, and means at the receiving station for converting the received oscillations into electric currents of low frequency.

13. In a secrecy system for wireless communication, means for generating and continuously radiating electrical oscillations of respectively different wave lengths, means for varying at will the relation of the characteristics of the respectively radiated waves without regard to the signal elements of the message to be transmitted, and means at the receiving station for converting the received oscillations so generated, varied and radiated, into electric currents of low frequency.

14. In a secrecy system for wireless communication, means for generating and continuously radiating in alternation electrical oscillations of respectively different wave lengths, means for relatively varying at a low frequency rate the characteristics of the radiated waves, and means controlled by the oscillations so generated, varied and radiated for making manifest the transmitted message.

15. In a secrecy system for wireless communication, means for generating and continuously radiating electrical oscillations of relatively different wave lengths, means for relatively varying at a low frequency harmonic rate a characteristic of the radiated waves, and means controlled by the conjoint action of the relatively varied and radiated oscillations for making manifest the transmitted message.

16. In a secrecy system for wireless communication, means for generating and continuously radiating electrical oscillations of relatively different wave lengths, means for relatively modifying the radiated waves, means for converting the oscillations so generated, modified and radiated, into electric currents of low frequency, and means whereby the signal is made manifest by the conjoint action of said low frequency currents.

17. In a secrecy system for wireless communication, means for generating and continuously radiating electrical oscillations of relatively different wave lengths, means for relatively varying the phase relation of the respectively radiated oscillations, means at the receiving station for converting the respective generated and radiated oscillations into electric currents, and means controlled by the conjoint action of said currents to make the received message manifest.

18. In a secrecy system for wireless communication, a plurality of continuously operating generating and radiating sets arranged to respectively radiate oscillations of different wave lengths, means for receiving the radiated oscillations and generating thereby, respectively, electric currents of low frequency, and means controlled by the conjoint action of said currents for making manifest the transmitted message.

19. A secrecy system for wireless communication including a plurality of radiating systems, operating to alternately transmit electrical oscillations respectively differing in the relation of their characteristics, and signal devices controlled by electric currents generated respectively by said radiations.

20. In a secrecy system for wireless communication, means for radiating electrical oscillations differing in characteristics, means for relatively varying such characteristics at will, means at the receiving station to convert the received oscillations so radiated and varied into low frequency electric currents, and means influenced by conjoint action of said electric currents for making manifest the transmitted message.

21. In a secrecy system for wireless communication, a plurality of transmitting antennæ respectively tuned to different wave lengths, continuously operating oscillating circuits respectively associated with said antennæ, means for relatively modifying the oscillations in the respective antennæ, a corresponding plurality of receiving antennæ respectively tuned to said transmitting antennæ, means associated with the receiving antennæ for converting the oscillations therein into low frequency electric currents, and means controlled by the conjoint action of said currents for making manifest the transmitted message.

In witness whereof I have hereunto set my hand this 5th day of October, 1908 in the presence of the subscribing witnesses.

LEE DE FOREST.

Witnesses:
  SAMUEL E. DARBY,
  R. WESTACOTT.